United States Patent
Guo et al.

(10) Patent No.: US 7,871,298 B2
(45) Date of Patent: Jan. 18, 2011

(54) STACKED CARD CONNECTOR

(75) Inventors: Jing-Jie Guo, Shenzhen (CN); Wei-Ping Liu, Shenzhen (CN); Yun-Jen Lee, Tu-Cheng (TW)

(73) Assignee: Hon Hai Precision Ind. Co., Ltd, Taipei Hsien (TW)

( * ) Notice: Subject to any disclaimer, the term of this patent is extended or adjusted under 35 U.S.C. 154(b) by 0 days.

(21) Appl. No.: 12/606,204

(22) Filed: Oct. 27, 2009

(65) Prior Publication Data

US 2010/0105247 A1     Apr. 29, 2010

(30) Foreign Application Priority Data

Oct. 27, 2008   (CN) .......................... 2008 2 0302543

(51) Int. Cl.
*H01R 24/00* (2006.01)
(52) U.S. Cl. ........................................ 439/630; 439/516
(58) Field of Classification Search .................. 439/516, 439/630
See application file for complete search history.

(56) References Cited

U.S. PATENT DOCUMENTS

| | | | | |
|---|---|---|---|---|
| 4,487,466 A | * | 12/1984 | Petit et al. .................. | 439/222 |
| 4,508,399 A | * | 4/1985 | Dowling et al. ............... | 439/67 |
| 4,689,597 A | * | 8/1987 | Galloway et al. ............. | 337/18 |
| 6,447,331 B1 | * | 9/2002 | Fukatsu et al. ............... | 439/516 |
| 6,796,852 B2 | * | 9/2004 | Okamoto ..................... | 439/736 |
| 7,645,166 B1 | * | 1/2010 | Wang .......................... | 439/630 |
| 2002/0061679 A1 | * | 5/2002 | Fukatsu et al. ............... | 439/516 |

FOREIGN PATENT DOCUMENTS

TW          380758        1/2000

* cited by examiner

*Primary Examiner*—Gary F. Paumen
(74) *Attorney, Agent, or Firm*—Wei Te Chung; Andrew C. Cheng; Ming Chieh Chang

(57) ABSTRACT

A stacked card connector (100) has a terminal module with a set of first terminals (2). The first terminals (2) have cantilever beams (22) and the cantilever beams (22) substantially spread in a plane, the first terminals vertically extend a leg (21) from the plane to a bottom face of stacked card connector; the first set of terminals (2) have a front row of terminals and a rear row of terminals, the first terminals (2) have contact portions (231) and transverse beams (222) connecting the contact portions (231) and the cantilever beams (22), the cantilever beams (22) of the front row of terminals branching vertically to the cantilever beam form a cross bar (221), the transverse beams (222) of the rear row of terminals extend lengthwise poles intersecting the cross bar (221) at nodes (223). The nodes (223) keep the first terminals (2) in a plane before injecting molding, and are cut off through the cutouts (113) to form a hole (224), the nodes (223) can make the first terminals have good flatness.

19 Claims, 5 Drawing Sheets

STACKED CARD CONNECTOR

BACKGROUND OF THE INVENTION

1. Field of the Invention

The present invention generally relates to a card connector, and more particularly to a stacked card connector for receiving different cards.

2. Description of Related Arts

The TW patent No. 380758 discloses an assembling method of terminals received in an input/output connector. The connector has an housing with some of terminal strips molded therein, a number of joint forming between neighboring terminals are cut off to be independent terminals.

Generally speaking, the terminals are independent because they would actuate different function. But, a strip of terminals has joints at an end, being beneficial to assembling. With the improvement of density of integration, a stacked card connector is provided for inserting several cards simultaneously. The stacked card connector has a number of engaging portions in an altitudinal direction. The upper engaging portion received a set of terminals therein is formed in an injecting molding process and the terminals in a molding device assumes to be a cantilever. The terminals spreading in a plane would be impacted by a force of gravity and flowing of melted plastic in the producing process of stacked card connector.

Hence, a stacked card connector whose terminals have a good flatness is desired.

SUMMARY OF THE INVENTION

Accordingly, an object of the present invention is to provide a stacked card connector whose terminals have a good flatness is desired.

To achieve the above object, a stacked card connector for receiving different cards comprises a first set of terminals having cantilever beams spreading in a plane and soldering legs extending from said plane to a bottom surface of the stacked card connector, said first set of terminals including a front row of terminals and a rear row of terminals are disposed along a transverse direction, the subbase defines cutouts at a region where a front row of terminal and a rear row of terminal are interconnected with each other by a carrier before insert molding said subbase on said terminals, and the carrier is cut off through the cutouts after insert molding said subbase on said terminals.

As has been described above, said terminals have nodes cut off through the cutout of the subbase and the nodes bind neighboring terminals together decreasing the effect by a force of gravity and flowing of melted plastic in the producing process of a stacked card connector.

Other objects, advantages and novel features of the invention will become more apparent from the following detailed description when taken in conjunction with the accompanying drawings.

DETAILED DESCRIPTION OF THE PREFERRED EMBODIMENT

Figure 1:
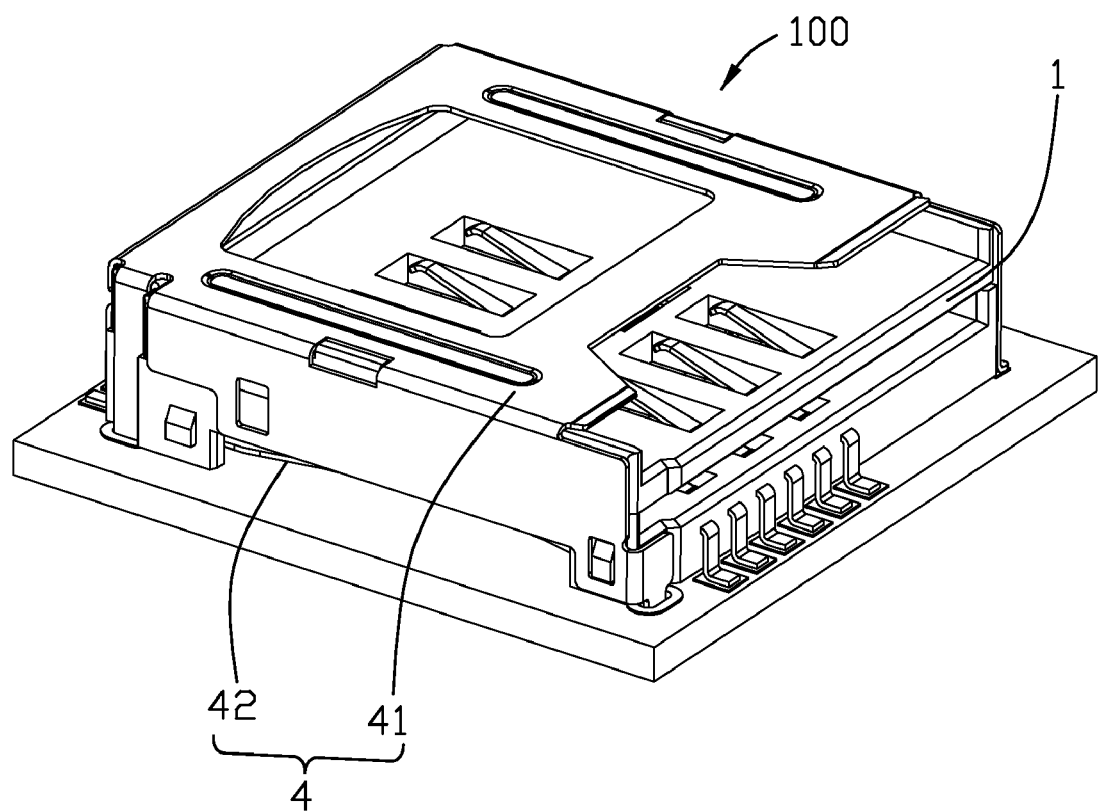
FIG. 1 is a perspective, assembled view of a stacked card connector.
Figure 2:
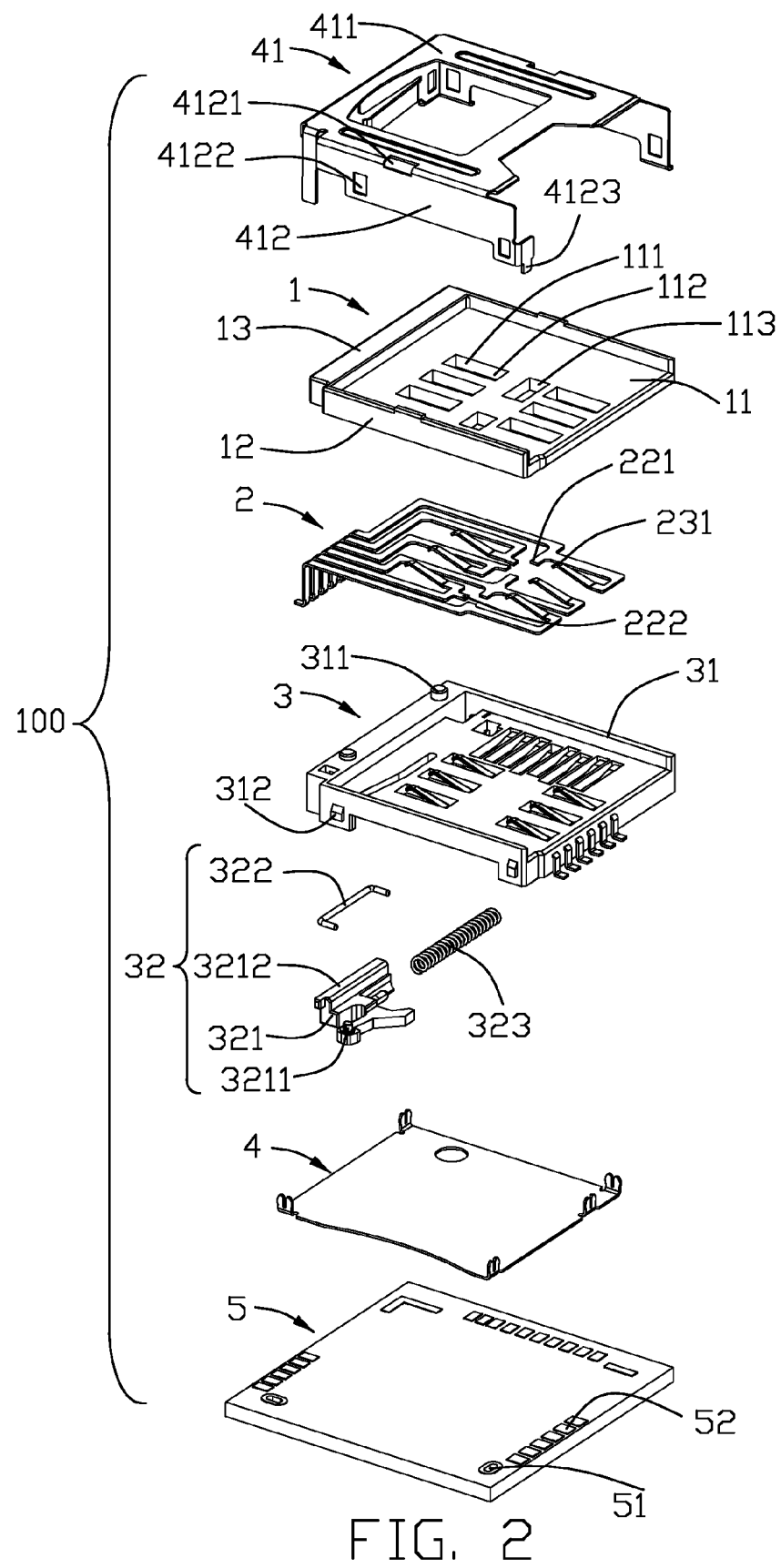
FIG. 2 is a perspective, exploded view of the multilayer card connector.
Figure 3:
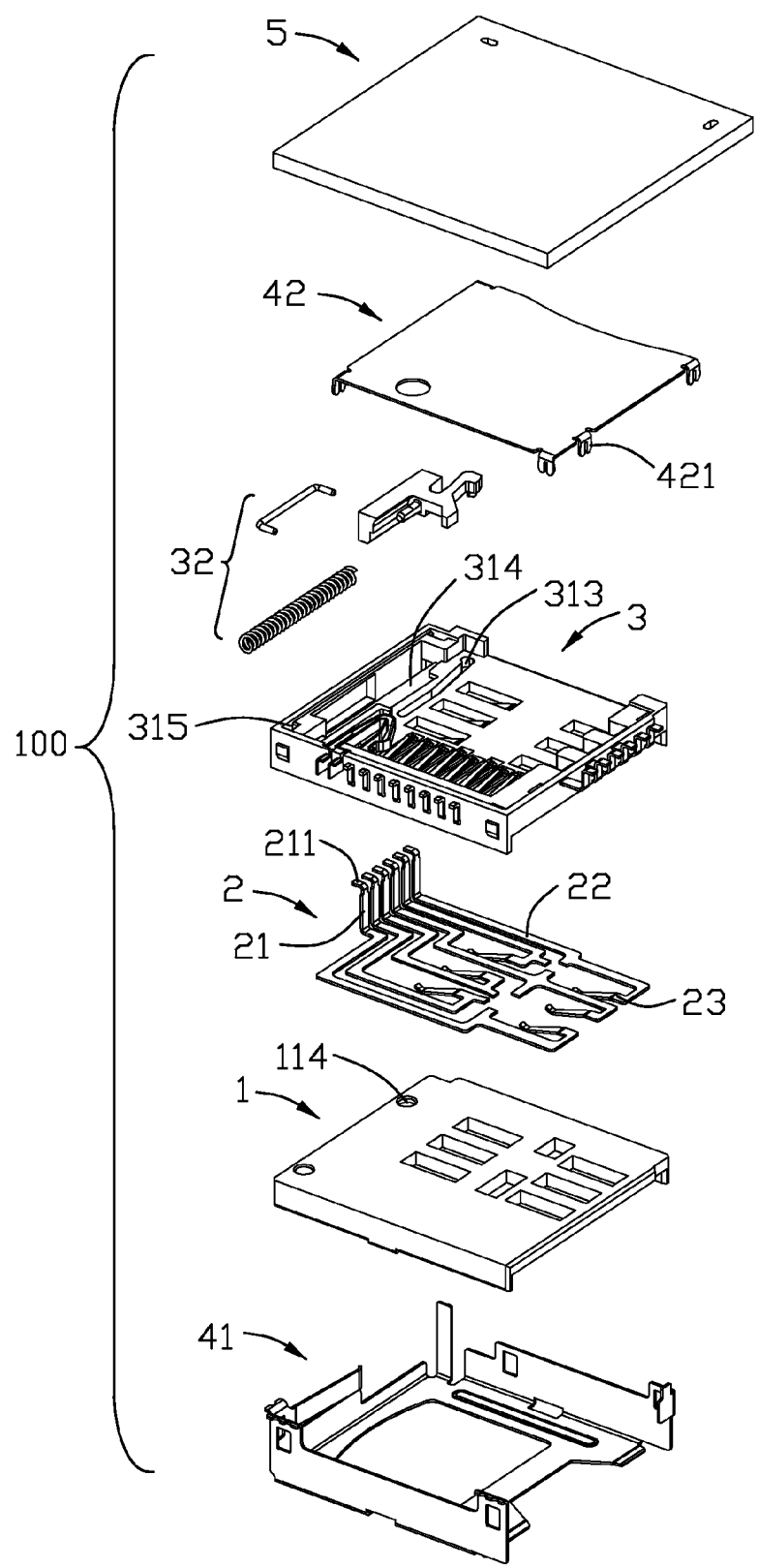
FIG. 3 is similar to FIG. 2, but viewed from another aspect.
Figure 4:
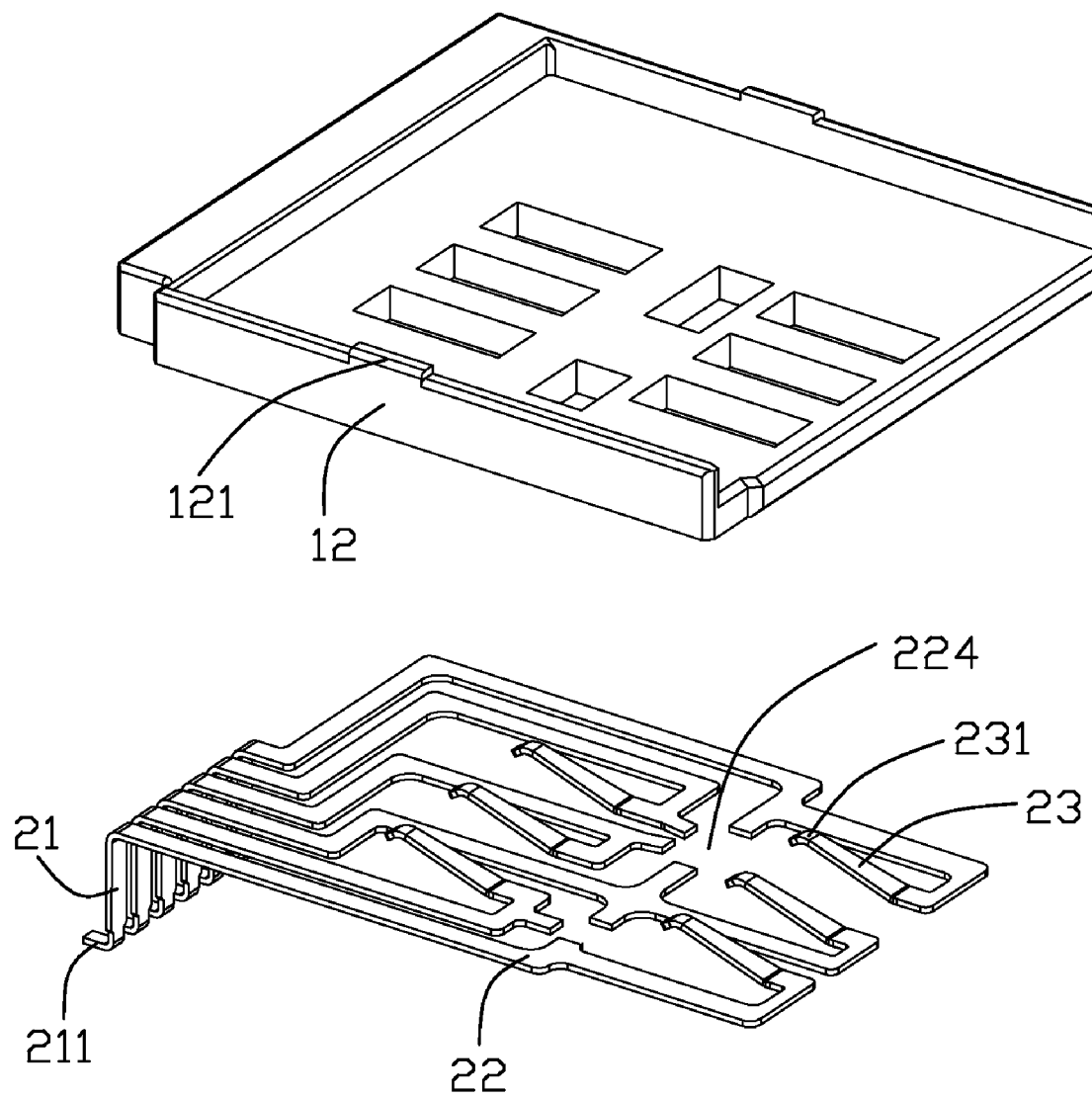
FIG. 4 is a perspective, exploded view of a terminal module after the removal of nodes.
Figure 5:
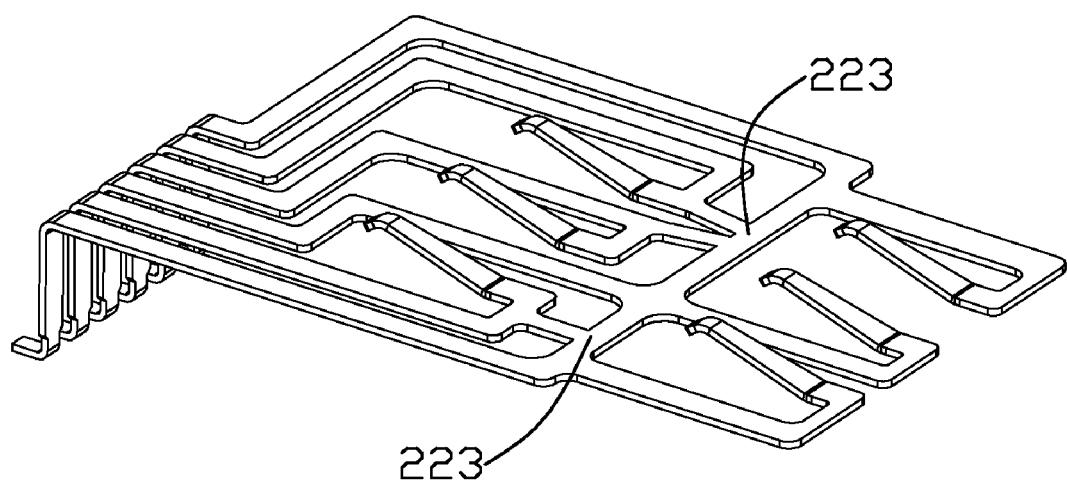
FIG. 5 is similar to FIG. 4, but before the removal of nodes.

Referring to FIGS. 1-3, a stacked card connector 100 comprises a main base 3 having a plurality of terminals received therein and a terminal module having a subbase 1 supported by the main base 3 and a first set of terminals 2 received in the subbase 1. The first terminals 2 have cantilever beams 22 and the cantilever beams 22 substantially spread in a plane, the first set of terminals 2 vertically extend a leg 21 from the cantilever beam 22 to a bottom face of the stacked card connector 100, the first set of terminals 2 have a front row of terminals and a rear row of terminals, the first set of terminals 2 have contact portions 231, and transverse beams 222 connecting the contact portions 231 and the cantilever beams 22, the cantilever beams 22 of the front row of terminals branching vertically to the cantilever beam 22 form a cross bar 221, the transverse beams 222 of the second type terminals extend lengthwise poles intersecting the cross bar 221 at nodes 223 (Shown in FIG. 5). A four branches node 223 is formed by two neighboring front row of terminals and two neighboring rear row of terminals.

The subbase 1 is made of dielectric material and has a bottom wall 11 and an edge portion 13 on a side of the bottom wall 11. A pair of first lateral walls 12 extends from a bottom face of the subbase 1, the bottom wall 11 has receiving passages 111 receiving said first set of terminals 2, and a top space is defined by the edge portion 13 and the first lateral walls 12 and the bottom wall 11. The contact portions 231 of the first set of terminals 2 extend through slots 112 beyond the bottom wall 11 for mating with a card. The slots 112 are mutually alignment in two rows and cutouts 113 are disposed between the slots 112. The nodes 233 are exposed to outside through the cutout 113. A number of holes 114 are placed in the bottom face of the edge portion 13.

A main base 3 has a plate and a pair of second lateral walls 31 extending upwards from the plate. A second set of contacts is received in the plate, contact portions of second set of contacts extend beyond the plate and orientate the same direction to the contact portions of first set of terminals 2. An ejector 32 mounted below the plate includes a movable block 321, a metal lever 322, and a spring 323. The lever 322 has two ends, one end is fixed in the main base 3, the other end is slideably assembled in the moveable block 321. The spring 323 is assembled between the main base 3 and the moveable block 321. A director 3211 located in the movable block 321 matches a trace 313 of the main base 3. With the guidance of director 3211, a slide member 3212 is moving in a groove 314 of the main base 3. A number of protrusions 311 engaged with the holes 114 are disposed in a top face of the main base 3. A third set of contacts fixed in the main base 3 extend downward beyond a bottom face of the main base 3.

A shell 4 includes a case 41 and a cover 42. The case 41 comprises a top cap 411 and lateral sheets 412 with mating holes 4121\4122 corresponding to mating projections 121\312 and nails 4123. The cover 42 has claws 421 on the periphery thereof.

A substrate 5 is further included, the first set of terminals 2 soldered to said substrate aligns in a line, the set of second terminals soldered to the substrate aligns in a different line, the third set of terminals soldered to the substrate aligns in another different line. Nails 4123 are inserted in the substrate 5.

In assembling process, the ejector 32 is mounted on the main base 3 where the set of second terminals and the set of the third terminals are molded, the terminal module is assembled to the main base 3 with the set of first terminals 2 received therein. Then surround the main base 3 and the terminal module with case 41, fix the cover 42 on the bottom face of the main base 3, a top space is defined by the case 41 and the terminal module, a middle space is defined by the terminal module and main base 3, a bottom space is defined by the main base 3 and the cover 42, each space have an opening, the opening of the top space and the middle space orient a first direction and the opening of the bottom space orient a different direction vertical to the first direction.

In the present invention, the first set of terminals 2 have cantilever beams 22 and the cantilever beams 22 substantially spread in a plane, the first terminals vertically extend a leg 21 from the plane to a bottom face of stacked card connector, the first set of terminals 2 have a front row of terminals and a rear row of terminals, the first set of terminals have contact portions 231 and transverse beams 222 connecting the contact portions 231 and the cantilever beams 22, the cantilever beams 22 of the front row of terminals branching vertically to the cantilever beam form a cross bar 221, the transverse beams 222 of the rear row of terminals extend lengthwise poles intersecting the cross bar 221 at nodes 223. The nodes 223 keep the first terminals in a plane before injecting molding, and are cut off through the cutouts 113 to form a hole 224, the nodes 233 can make the first set of terminals have good flatness.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A stacked card connector for receiving different cards comprising:
    a main base having a plurality of contacts received therein;
    a terminal module having a subbase supported by the main base and a first set of terminals received in the subbase;
    said first set of terminals having cantilever beams spreading in a plane and soldering legs extending perpendicularly from said plane to a bottom surface of the stacked card connector, said first set of terminals disposed along a transverse direction including a front row of terminals and a rear row of terminals; wherein
    the subbase defines cutouts at a region where the front row of terminals and the rear row of terminals are interconnected with each other by a carrier before insert molding said subbase on said terminals, and the carrier is cut off through the cutouts after insert molding said subbase on said terminals.

2. The stacked card connector as described in claim 1, wherein each of the first set of terminals has a contact portion which extends beyond the plane where the cantilever beam are located.

3. The stacked card connector as described in claim 2, wherein said subbase is removeably assembled on the main base.

4. The stacked card connector as described in claim 3, wherein a hole is defined in the subbase, and a protrusion is defined in the main base and received in the hole.

5. The stacked card connector as described in claim 4, wherein the contacts received in the main base includes a second set of contacts and a third set of contacts.

6. The stacked card connector as described in claim 5, wherein the second set of contacts and the third set of contacts have contact portions exposed on opposite sides of the main base.

7. The stacked card connector as described in claim 6, wherein the first set of terminals, the second set of contacts and the third set of contacts have solder portions extending along different lines.

8. The stacked card connector as described in claim 7, further comprising a shell shielding the main base and the terminal module, wherein a top space is defined by the shell and the terminal module, a middle space is defined by the terminal module and main base, a bottom space is defined by the main base and a cover.

9. A stacked card connector assembly comprising:
    a first insulative base essentially extending in a first horizontal plane;
    a second insulative base essentially extending in a second horizontal plane;
    said first base defining a first receiving space, for receiving a first card, separated from the second base by said first base, said second base defining a second receiving space, for receiving a second card, separated from the first base by said second base, and a third receiving space, for receiving a third card sandwiched between the first base and the second base;
    said first base being equipped with a set of first contacts each having a first contacting section extending into the first receiving space; and
    said second base being equipped with a set of second contacts each having a second contacting section extending into the third receiving space; wherein
    at least one of said first base and said second base is further equipped with a set of third contacts each having a third contacting sections extending into the third receiving space.

10. The stacked card connector assembly as claimed in claim 9, wherein said at least one of the first base and the second base is the first base.

11. The stacked card connector assembly as claimed in claim 10, wherein said first receiving space and said third receiving space define different mating directions of the corresponding first card and the third card.

12. The stacked card connector assembly as claimed in claim 11, wherein said second receiving space defines a mating direction of the second card same with that of the first card.

13. The stacked card connector assembly as claimed in claim 9, wherein the second base is stacked upon the first base and thus higher than a first base relative to a printed circuit board on which both said set of first contacts and said set of second contacts are soldered.

14. The stacked card connector assembly as claimed in claim 13, wherein the first base and the second base are assembled as one piece housing, and the set of the first contacts are soldered to the printed circuit board by a first side of said one piece housing while the set of the second contacts are soldered to the printed circuit board by a second side of said one piece housing opposite to the first side.

15. The stacked card connector assembly as claimed in claim 13, wherein a first cover is assembled around the first base to isolated the first receiving space from the printed circuit board, and the second cover is assembled around the second base to isolated the second receiving space from an exterior in an upward direction.

16. The stacked card connector assembly as claimed in claim 15, wherein said set of second contacts are insert molded with the second base under condition that the second base defines a cutout around an interconnection region of two of said set of second contacts so as to ease removing said interconnection region via said cutout after insert molding the set of the second contacts with the second base for result in independencies of said two respective contacts.

17. A stack card connector assembly comprising:
an insulative base;
six contacts being insert molded with the base, said contacts including six corresponding soldering tails aligned with each other in a first direction beside the base, and six main stems essentially extending along a second direction perpendicular to said first direction under condition that said six main stems original linked with one another via a transverse bar while successively separated from one another via removal of a portion of material of said transverse bar at two spaced positions at two spaced cutouts of the base so as to assure each individual one of said six contacts are independent from one another, wherein each of said six contacts defines a U-shaped structure linked to the corresponding main stem with one arm of said U-shaped structure is a spring contact section, said U-shaped structures being arranged in two rows, the spring contact section in one of said two rows being aligned, in a second direction, with another spring contact section of a neighboring contact.

18. The stacked card connector assembly as claimed in claim 17, wherein removal of the material of the transverse bar at one of said two positions separates four of said contacts.

19. The stacked card connector assembly as claimed in claim 18, wherein said four of the contacts having the corresponding contacting sections in said two rows under condition that two of said four contacts in the row closer to the soldering tails having the corresponding U-shaped structures face in a same direction while other two of said four contacts in the row farther from the soldering tails having the corresponding U-shaped structures face in opposite direction even if corresponding spring contact sections are aligned, in the second direction, with each other in two rows.

* * * * *